United States Patent
Leon et al.

(10) Patent No.: US 6,780,942 B2
(45) Date of Patent: Aug. 24, 2004

(54) METHOD OF PREPARATION OF POROUS POLYESTER PARTICLES

(75) Inventors: Jeffrey W. Leon, Rochester, NY (US); Jeanne E. Kaeding, Rochester, NY (US); Robert E. Mccovick, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 399 days.

(21) Appl. No.: 10/027,701

(22) Filed: Dec. 20, 2001

(65) Prior Publication Data

US 2003/0130415 A1 Jul. 10, 2003

(51) Int. Cl.$^7$ .............................. C08J 3/26; C08L 67/06
(52) U.S. Cl. .................. 525/445; 525/447; 523/340; 523/342; 523/500; 524/845; 528/501
(58) Field of Search ................. 525/445, 447; 523/340, 342, 500; 524/845; 528/501

(56) References Cited

U.S. PATENT DOCUMENTS

| | | |
|---|---|---|
| 3,822,224 A | 7/1974 | Gillan et al. |
| 3,923,704 A | 12/1975 | Gunning et al. |
| 3,933,579 A | 1/1976 | Kershaw et al. |
| 3,979,342 A | 9/1976 | Baidins et al. |
| 4,089,819 A | 5/1978 | Coates et al. |
| 4,137,380 A | 1/1979 | Gunning et al. |
| 4,363,888 A | 12/1982 | Willison et al. |

FOREIGN PATENT DOCUMENTS

| | | |
|---|---|---|
| EP | 0 467 528 A2 | 1/1992 |
| GB | 1395065 | 5/1975 |
| JP | 07-070331 A | 3/1995 |
| JP | 07-137432 A | 5/1995 |
| JP | 07-137433 A | 5/1995 |
| JP | 07-179533 A | 7/1995 |

OTHER PUBLICATIONS

Co-pending USSN 10/028,130, Landry-Coltrain et al., *Small Porous Polyester Particles for Inkjet Use*.
Co-pending USSN 10/028,129, Landry-Coltrain et al., *Multilayer Inkjet Recording Element With Porous Polyester Particles*.
Japanese Patent Abstract 06313021.

*Primary Examiner*—Tae H. Yoon
(74) *Attorney, Agent, or Firm*—Lynne M. Blank

(57) ABSTRACT

The present invention relates to a method of forming porous particles comprising preparing a mixture of an organic phase and an aqueous phase comprising an unsaturated polyester, a water immiscible organic solvent, at least one organic-soluble ethylenically unsaturated monomer, and initiator, subjecting said mixture to high energy emulsification, initiating crosslinking of said polyester after emulsification, removing said water immiscible organic solvent to recover porous polyester particles.

34 Claims, 4 Drawing Sheets

METHOD OF PREPARATION OF POROUS POLYESTER PARTICLES

CROSS REFERENCE TO RELATED APPLICATIONS

Reference is made to commonly assigned, co-pending U.S. patent applications:

Ser. No. 10/028,130 by Landry-Coltrain et al., filed of even date herewith entitled "Small Porous Polyester Particles for Inkjet Use"; and Ser. No. 10/028,129 by Landry-Coltrain et al., filed of even date herewith entitled "Multilayer Inkjet Recording Element with Porous Polyester Particles".

FIELD OF THE INVENTION

This invention relates to a method for the preparation of porous, crosslinked polyester-containing particles.

BACKGROUND OF THE INVENTION

Porous, polyester-based particles, also referred to as beads, have projected uses as adsorbents, ion exchange resins, opacifying additives for coatings, matting and texturizing agents, and fillers. Several methods have been disclosed for the production of such particles or beads. All of these methods, however, suffer from specific limitations as to the morphologies of the beads which can be produced, the composition of the polyesters which can be successfully used, and the feasibility of the process for large-scale production.

Perhaps the most widely reported method involves the rapid crosslinking of a water-in-oil-in-water emulsion in which the oil phase contains an unsaturated polyester and one or more monomers which serve to copolymerize with the double bonds in the backbone of the polyester thereby crosslinking the particle. The presence of individual water droplets within the organic phase serves to create voids within the resultant polyester particles, hence introducing the porosity. This process is described in U.S. Pat. Nos. 3,979,342, 4,089,819, 4,363,888, 3,822,224, 3,923,704, 4,137,380, 3,933,579, and in GB 1,395,065. This process suffers from several limitations. First, this process is useful for only a narrow class of polyesters. The process cannot be used for polymers with a high degree of water-solubility. Thus, polymers with a high density of water-soluble functions, such as sulfonates, PEO segments, or quaternary ammonium units, cannot be used. This method is primarily useful for low molecular weight polyesters with acid numbers within a specific range and with carboxylic acid end groups which are neutralized using specific agents. Second, process control is difficult as the particle size is very highly dependent on pH and degree of agitation. Third, the colloidal stability of beads prepared by this process is often poor, and settling of the product dispersions can be a problem. Most importantly, the pore morphology of the beads prepared by this process is described in the patents as "noncontinuous" or "vesiculated." In other words, the hollows within the bead are not interconnected, but exist as discrete voids. This severely limits the utility of the beads in such applications as chromatography supports, ion exchange resins, and adsorbents. Also, it is difficult to produce very small particles, such as particles having a mean diameter of less than 1 $\mu$m, using this method.

A second method called "gentle cohesion" is disclosed for the preparation of porous polyester beads in Japanese Kokais 07-179533, 07-137432, 07-137433, and 07-070331. In this method, a dispersion of very small polyester precursor particles is formed by dissolving a polyester which contains charged groups, either pendant charged units or neutralized carboxylic acid end groups, in a water-miscible organic solvent, adding water, and removing the organic solvent by evaporation. These precursor particles are coalesced into larger "clustered" particles by the addition or generation of carefully controlled levels of electrolyte. These larger particles are fused by heating the clustered particles above the glass transition temperature. They are then swelled with a crosslinking monomer and an initiator and heated to yield the final, crosslinked beads. Like the water-in-oil-in-water emulsion method, the utility of this method is limited to only specific types of polyesters. If the process is applied to polymers with a high degree of water-solubility, the precursor particles cannot be formed. Secondly the procedure will not work for polymers with a glass transition temperature below room temperature or above the boiling temperature of the solvent, such as water, in this case. This procedure is difficult to apply to large scale due to the preponderance of process variables, and it is difficult to use this method to produce particles with a mean diameter of less than 1 $\mu$m. Finally, this procedure yields only one type of bead morphology.

It is an object of this invention to provide a method for making small porous polyester particles, which demonstrate excellent stability, using a broad range of polyesters in a process that is easily controlled.

SUMMARY OF THE INVENTION

The present invention relates to a method of forming porous particles comprising preparing a mixture of an organic phase and an aqueous phase comprising an unsaturated polyester, a water immiscible organic solvent, at least one organic-soluble ethylenically unsaturated monomer, and initiator, subjecting said mixture to high energy emulsification, initiating crosslinking of said polyester after emulsification, removing said water immiscible organic solvent to recover porous polyester particles.

The method of the invention provides advantages with respect to the ability to use polyesters of an extremely broad compositional latitude with no restrictions due to glass transition temperature. In addition, this method offers, as an advantage, relatively simple process control and is ideally suited for high volume production. The colloidal stability of particles prepared by this method is excellent and a wide variety of pore morphologies can be attained. The porous, polyester-based particles or beads made by this method are useful as adsorbents, opacifying additives for coatings, matting and texturizing agents, and fillers.

DETAILED DESCRIPTION OF THE INVENTION

Figure 1:
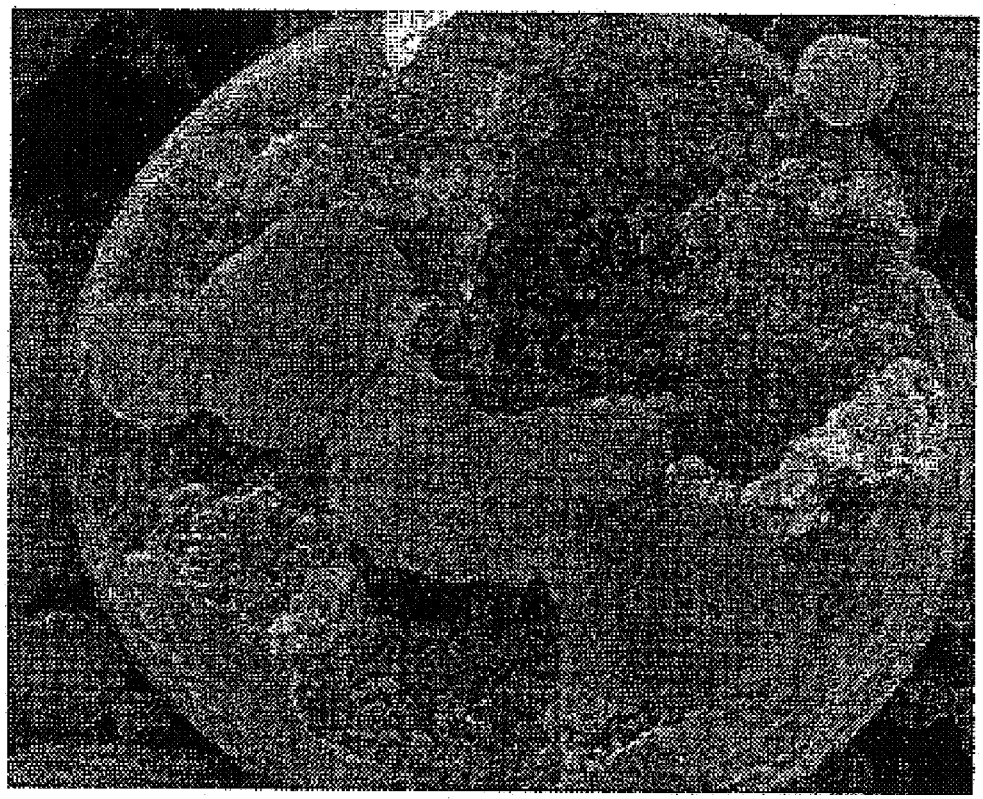
FIG. 1. Scanning electron micrograph of Bead 1 in Example 3.

The method described herein for preparing crosslinked, porous polyester beads comprises crosslinking an unsaturated polyester within an oil-in-water emulsion in the presence of a water-immiscible organic solvent. The crosslinking reaction is a radical-initiated polymerization of an ethylenically unsaturated monomer which readily copolymerizes with the unsaturated units in the polyester. The polyester can be organic-soluble, in which case an added emulsifying agent is necessary. In another embodiment of this method, the polyester can be water-soluble, water-dispersible, or amphiphilic in character, in which case the polyester acts as the emulsifying species and an added emulsifying agent is merely optional. The water-immiscible organic solvent is removed by any means, including boiling, evaporation, solvent extraction, vacuum drying, or dialysis to yield a dispersion of porous, crosslinked, polyester-containing particles.

This method of the invention can be easily scaled up and can be applied to a very wide variety of unsaturated polyesters, which can be water-soluble, water-dispersible, or oil-soluble. The polyesters which can be used are not restricted by their glass transition temperature and a diversity of particle morphologies can be afforded by this technique. This method comprises preparing a mixture of an organic phase and an aqueous phase comprising an unsaturated polyester, a water immiscible organic solvent, at least one organic-soluble ethylenically unsaturated monomer, an initiator, and optionally an added surfactant, emulsifier, cosurfactant, or stabilizer compound. The polyester and initiator may be present in the mixture in either the aqueous or organic phase. The mixture is subjected to high energy emulsification by any of a variety of methods including, but not limited to high shear mixing, sonication, homogenization, and microfluidization and crosslinking is initiated by either heating or addition of one component of a multiple component redox initiation system. In the preferred embodiment, heating should be in the temperature range of between 30 and 100 degrees C. and for a period of between 0.5 and 16 hours. The water immiscible organic solvent is then removed to afford an aqueous dispersion of the porous polyester beads, which can then be isolated as a solid if desired.

The polyesters useful for this invention are branched or unbranched, contain chemical unsaturation, and are soluble either in water-immiscible organic solvents or in water. Optionally, the polyester may be self-emulsifying in water or amphiphilic or surfactant-like in character. The polyesters may have any glass transition temperature, provided the polyester fulfills the solubility requirements. Preferably, the number average molecular weight (Mn) is between 1,000 and 30,000 gm/mole.

As is well known in the art, polyesters are condensation products of polybasic acids or of corresponding acid equivalent derivatives such as esters, anhydrides or acid chlorides and polyhydric alcohols. Whenever "diacids" or "polyacids" are referred to in this document, the corresponding acid equivalent derivatives such as esters, anhydrides or acid chlorides are also included by reference. Polymerizable unsaturation may be introduced into the molecule by the selection of a polybasic acid or polyhydric alcohol which contains α,β-ethylenic unsaturation. In most cases, the unsaturation will be contained within the polybasic acid unit. Preferably, the unsaturated polyester will contain at least 20 mole percent unsaturated diacid units based on total diacid units. Optionally, one or more additional polyacids common in the art of polycondensation may be used in addition to the unsaturated polyacid. Thus ethylenically unsaturated polyacids include, but are not necessarily limited to maleic, fumaric, itaconic, phenylenediacrylic acid, citraconic and mesaconic acid. Other, additional polyacids which do not contain chemical unsaturation and can be used in polyesters are described in WO 01/00703. These diacids can include, but are not necessarily limited to malonic, succinic, glutaric, adipic, pimelic, azelaic, and sebacic acids, phthalic, isophthalic, terephthalic, tetrachlorophthalic, tetrahydrophthalic, trimellitic, trimesic, isomers of naphthalenedicarboxylic acid, chlorendic acid, trimellitic acid, trimesic acid, and pyromellitic acid.

Ethylenically unsaturated groups can also be introduced into the polyester by synthetic modification of a precursor polyester. For example, a polyester with a high alcohol number can be reacted with an anhydride or acid chloride of acrylic acid or methacrylic acid in order to introduce ethylenically unsaturated units.

Polyesters which are suitable for this invention can furthermore be comprised of any of a wide variety of polyhydric alcohols which are well known in the art of polycondensation and may be aliphatic, alicyclic, or aralkyl. A description of suitable polyhydric alcohols is given in WO 01/00703. These alcohols can include, but are not necessarily limited to ethylene glycol, 1,3-propylene glycol, 1,6-hexanediol, 1,10-decanediol, 1,4-cyclohexanedimethanol, 1,4-cyclohexanediol, hydroquinone bis (hydroxyethyl) ether, diethylene glycol, neopentyl glycol, bisphenols such as bisphenol A, ethylene oxide and propylene oxide adducts of bisphenol A, pentaerythritol, trimethylolpropane, and polyester polyols, such as that obtained by the ring-opening polymerization of ε-caprolactone. Additionally, A-B type polycondensation monomers which contain both hydroxyl and acid derivative functions can be used as well as monoacids and mono alcohols.

In one embodiment of this invention, polyesters which are water-soluble, surfactant-like, or self-emulsifying and additionally contain chemical unsaturation may be utilized. Water-soluble, surfactant-like, and self-emulsifying polyesters are well known in the art and will contain one or more types of hydrophilic chemical group such as carboxylate, quaternary ammonium, sulfonate, sulfate, sulfonium, phosphonium, iminosulfonyl, or polymeric or oligomeric oxyethylene segments. Polyesters useful in this invention will additionally contain one or more polyacid or polyol monomers which contain ethylenic unsaturation as detailed above. The water-soluble, surfactant-like, and self-emulsifying polyesters useful in this invention may contain one or more diacid or diol components which can induce hydrophilic character or water-solubility. The most common hydrophilic diol used for this purpose is polyethylene glycol. Additionally, tertiary amine units substituted with two or three hydroxyalkyl groups can be incorporated within a polyester and rendered ionic either by quaternization with an alkylating agent or by neutralization with an acid. A commonly used class of diacid components used to impart hydrophilicity to polyesters includes compounds containing sulfonate or sulfonimide salts. Some suitable sulfonated diacids are described in U.S. Pat. Nos. 4,973,656 and 5,218,042 and are incorporated herein by reference. Examples of such diacids are 5-sodiosulfoisophthalic acid, 2-sodiosulfobutanoic acid, and di-Me sodioiminobis (sulfonyl-m-benzoate). Another common strategy for the hydrophilization of polyesters involves the neutralization of the acid end groups of polyester with a relatively high acid number. Preferably, the acid number is at least 10. Most preferably the acid number is greater than 25. The neutralization agent is usually an alkali metal hydroxide or an amine. Polyesters containing ethylenic unsaturation and neutralized acid end groups can also be used in this invention. In the preferred case, the unsaturated polyester will contain an ionic group equivalent molecular weight of between 400 and 2000 grams of polymer per mole of ionic unit.

The ethylenically unsaturated monomers useful for crosslinking the polyesters in this invention are monomers commonly used in the art of addition polymerization. These include, but are not necessarily limited to methacrylic acid esters, such as methyl methacrylate, ethyl methacrylate, isobutyl methacrylate, 2-ethylhexyl methacrylate, benzyl methacrylate, phenoxyethyl methacrylate, cyclohexyl methacrylate and glycidyl methacrylate, acrylate esters such as methyl acrylate, ethyl acrylate, isobutyl acrylate, 2-ethylhexyl acrylate, benzyl methacrylate, phenoxyethyl acrylate, cyclohexyl acrylate, and glycidyl acrylate, styrenics such as styrene, α-methylstyrene, 3- and 4-chloromethylstyrene, halogen-substituted styrenes, and alkyl-substituted styrenes, vinyl halides and vinylidene halides, N-alkylated acrylamides and methacrylamides, vinyl esters such as vinyl acetate and vinyl benzoate, vinyl ethers, allyl alcohol and its ethers and esters, and unsaturated ketones and aldehydes such as acrolein and methyl vinyl ketone, isoprene, butadiene and acrylonitrile.

In addition, small amounts, typically less than 40% of the total weight of the polymerizeable solids, of one or more water-soluble ethylenically unsaturated monomer can be used. Such monomers include but are not necessarily limited to styrenics, acrylates, and methacrylates substituted with highly polar groups, unsaturated carbon and heteroatom acids such as acrylic acid, methacrylic acid, fumaric acid, maleic acid, itaconic acid, vinylsulfonic acid, vinylphosphonic acid, and their salts, vinylcarbazole, vinylimidazole, vinylpyrrolidone, and vinylpyridines.

Especially useful in this invention are monomers containing at least two ethylenically unsaturated chemical functionalities. These functionalities may be vinyl groups, acrylates, methacrylates, vinyl ethers and vinyl esters. Monomers include, but are not limited to trimethylolpropane triacrylate, ethylene glycol dimethacrylate, isomers of divinylbenzene, and ethylene glycol divinyl ether.

Ethylenically unsaturated monomers which are preferred for this invention are styrenics, vinyl ethers, and methacrylates. Divinylbenzene (m, and p isomers), styrene, ethylene glycol dimethacrylate, divinyl adipate, and cyclohexanedimethanol divinyl ether are especially preferred.

Any of the common water-soluble or organic-soluble free radical polymerization initiators known in the art of addition polymerization can be used for this invention. These include, but are not restricted to azo compounds, such as 2,2'-azobis(4-methoxy-2,4-dimethylvaleronitrile), (1-phenylethyl)azodiphenylmethane, 2-2'-azoisobutyronitrile (AIBN), 1,1'-azobis(1-cyclohexanedicarbonitrile), 4,4'-azobis(4-cyanopentanoic acid), and 2,2'-azobis(2-amidinopropane) dihydrochloride, organic peroxides, organic hydroperoxides, peresters, and peracids such as benzoyl peroxide, lauryl peroxide, capryl peroxide, acetyl peroxide, t-butyl hydroperoxide, t-butyl perbenzoate, cumyl hydroperoxide, peracetic acid, 2,5-dimethyl-2,5-di(peroxybenzoate), and p-chlorobenzoyl peroxide, persulfate salts such as potassium, sodium and ammonium persulfate, disulfides, tetrazenes, and redox initiator systems such as $H_2O_2/Fe^{2+}$, persulfate/bisulfite, oxalic acid/$Mn^{3+}$, thiourea/$Fe^{3+}$, and benzoyl perozide/dimethylaniline.

The organic solvents useful in the present invention include or are defined as water immiscible, carbon containing compounds which are liquids at or below room temperature. A water-immiscible organic solvent is included in the organic phase of this invention. The sole criteria for the selection of this solvent is that it is water-immiscible, and does not quench the crosslinking reaction or undergo any other side reactions to an appreciable extent that it would interfere with the process or introduce any unintended byproducts or contaminants. It is desirable that the organic-soluble monomers and the organic soluble polyester are soluble in this solvent. It is not necessarily required, however that the product polyester beads have a high compatibility with the solvent or can be readily swelled by the solvent. It is furthermore desirable, but not required, that the solvent have a boiling point sufficiently low as to be easily removed by evaporation under atmospheric or reduced pressure. Useful water-immiscible organic solvents of this invention include, but are not necessarily limited to toluene, benzene, ethyl acetate, propyl acetate, butyl acetate, carbon tetrachloride, chloroform, isopropyl ether, xylenes, hexane, heptane, octane, petroleum ethers, cyclohexanol, butanol, 1-dodecanol, cyclohexanone, chloroform, methylene chloride, and 1,2-dichloroethane. Toluene, ethyl acetate, and propyl acetate are preferred.

Optionally, a small amount of a cosurfactant stabilizer, typically comprising 1–10% by weight of the organic phase, may be added to the organic phase of this invention. These hydrophobic compounds are known to prevent Ostwald ripening in certain types of emulsion and suspension polymerization. Excellent discussions of cosurfactants are given in *Emulsion Polymerization and Emulsion Polymers* by Peter A Lovell and Mohammed S. El-Aaser, (John Wiley and Sons: Chichester, 1997, pp. 700–721) and U.S. Pat. No. 5,858,634. The most common cosurfactants are hexadecane and hexadecanol. Other useful cosurfactants may also serve other roles, such as acting as monomers or initiators. An example of the former is lauryl methacrylate. An example of the latter is lauroyl peroxide.

If a polyester is used in this invention which is not soluble or dispersible in water, then an emulsifier must additionally be used, although an emulsifier can be used in tandem with a water-soluble or water-dispersible polyester. It is preferable that the emulsifier be present in the aqueous phase. Though a very large variety of emulsifiers are known in the art, most of these fit into the three basic categories of surfactants, colloidal inorganics, and protective colloids. There exist a tremendous number of known surfactants. Good reference sources for surfactants are the *Surfactant Handbook* (GPO: Washington, D.C., 1971) and *McCutcheon's Emulsifiers and Detergents* (Manufacturing Confectioner Publishing Company: Glen Rock, 1992). There are no general restrictions for the surfactants which are useful in this invention. Useful surfactants can be anionic, cationic, zwitterionic, neutral, low molecular weight, macromolecular, synthetic, or extracted or derived form natural sources. Some examples include, but are not necessarily limited to: sodium dodecylsulfate, sodium dodecylbenzenesulfonate, sulfosuccinate esters, such as those sold under the AEROSOL® trade name, flourosurfactants, such as those sold under the ZONYL® and FLUORAD® trade names, ethoxylated alkylphenols, such as TRITON® X-100 and TRITON® X-705, ethoxylated alkylphenol sulfates, such as RHODAPEX® CO-436, phosphate ester surfactants such as GAFAC® RE-90, hexadecyltrimethylammonium bromide, polyoxyethylenated long-chain amines and their quaternized derivatives, ethoxylated silicones, alkanolamine condensates, polyethylene oxide-co-polypropylene oxide block copolymers, such as those sold under the PLURONIC® and TECTRONIC® trade names, N-alkylbetaines, N-alkyl amine oxides, and fluorocarbon-poly(ethylene oxide) block surfactants, such as FLUORAD® FC-430.

Protective colloids useful in this invention include, but are not necessarily limited to: poly (ethylene oxide), hydroxyethyl cellulose, poly (vinyl alcohol), poly (vinyl pyrrolidone), polyacrylamides, polymethacrylamides, sulfonated polystyrenes, alginates, carboxy methyl cellulose, polymers and copolymers of dimethylaminoethylmethacrylate, water soluble complex resinous amine condensation products of ethylene oxide, urea and formaldehyde, polyethyleneimine, casein, gelatin, albumin, gluten and xanthan gum. Protective colloids are a class of emulsifiers which are used in lieu of or in addition to a surfactant. They are typically dissolved or dispersed in the aqueous phase prior to the emulsification step.

Similarly, colloidal inorganic particles can be employed as emulsifiers as part of a limited coalescence process.

Colloidal inorganic particles can be employed in lieu of or in addition to any other type of emulsifier listed, such as a surfactant or protective colloid. They are also dispersed in the aqueous phase. Limited coalescence techniques have been describe in numerous patents such as U.S. Pat. Nos. 4,833,060 and 4,965,131. A colloidal inorganic which is particularly useful in this invention is LUDOX® TM sold by Du Pont.

Additional additives which can be incorporated into a formulation useful in this invention include pigments, dyes, biocides, fungicides, electrolytes, buffers, UV-absorbers, antioxidants and chain transfer agents.

A basic formulation for polyester beads prepared by the method of this invention is as follows:

The respective amounts of the polyester and the ethylenically unsaturated monomer are chosen such that the weight ratio is between 19:1 and 1:19. Preferably, this ratio is between 1:7 and 7:1 and most preferably this ratio is between 4:1 and 1:4.

The amount of water-immiscible organic solvent is chosen in such an amount that it will comprise 5–95% of the organic phase by weight.

Preferably, it will comprise 20–80% of the organic phase. Most preferably, it will comprise 30–60% of the organic phase.

The amount of cosurfactant stabilizer is chosen in such an amount that it will comprise 0–10% by weight of the organic phase. Preferably, it will comprise 0.5–5%. Most preferably, it will comprise 1–4% of the organic phase.

The emulsifier is chosen in such an amount that the ratio of the weight of emulsifier to the sum of the weight of the polyester plus the ethylenically unsaturated monomers is between 0.20 and 0.0025. Preferably, the ratio is between 0.1 and 0.01. Most preferably, the ratio is between 0.02 and 0.07. If a water-soluble, water-dispersible, or surfactant-like polyester is used, then the bottom limits of these ratios are zero, i.e. no emulsifier need be employed.

Water is added in such an amount that the total aqueous phase will comprises 20–95% of the total weight of the formulation. Preferably, the aqueous phase will comprise 40–80%. Most preferably, the aqueous phase will comprise 60–80%

The appropriate amounts of any additional addenda may be added. Depending on the requirements of the class of addenda, preferably less than 5% based on the total weight of the reaction will be additional addenda.

In the execution of this invention, all of the formulation components are dissolved or dispersed in the phase, either aqueous or organic, in which they are soluble or dispersible. The two phases are combined and are emulsified by either sonication or a high shear mixing method or a combination of methods used in succession. By high shear mixing, it is meant that sufficient shearing energy is provided by approximately a rate of shear or velocity gradient of $10^5$ min$^{-1}$ or greater, more preferably $10^6$ min$^{-1}$ or greater. By rate of shear is meant a value obtained by dividing an absolute value of a difference of speeds of two planes by a distance between said two planes. A high pressure homogenizer operated at 1400 psi provides a rate of shear approximately equal to $6\times10^6$ min$^{-1}$. High pressure homogenizers are preferred. The emulsification can be performed using methods and devices widely used in the art including, but not necessarily limited to, a high speed blade mixer, a chemical blender, a rotor stator device such as a Silverson mixer or high pressure homogenizer such as a Manton-Gaulin Homogenizer, a Sonolator, a probe sonicator, or a Microfluidizer®. A preferred emulsification device is the Model No. 110T Microfluidizer® produced by Microfluidics Manufacturing.

The emulsified polyester bead formulation is preferably degassed by bubbling with an inert gas such as nitrogen or argon. The formulation is then brought to a temperature at which the polymerization initiator is known to be sufficiently active and held for a period of time sufficient to complete the crosslinking reaction. For example, using AIBN or potassium persulfate, 2–24 hours at 60–80° C. is usually sufficient. For the persulfate/bisulfite redox system, 2–24 hours at 25–40° C. is usually sufficient. Optionally, a room-temperature initiator system or one component of a two component redox initiator system can be added after the emulsification to initiate the crosslinking.

When the crosslinking reaction is completed, the water-immiscible organic solvent may be removed. This can be achieved by rotary evaporation, azeotropic evaporation, low pressure distillation (LPD) or by boiling optionally under a stream of an inert gas such as nitrogen. Certain solvents which form an azeotrope with water, such as toluene, can be easily removed by simple distillation. Another useful method for solvent removal is dialysis, diafiltration, or ultrafiltration using an intermediate polarity solvent with which both water and the organic solvent have solubility. Alcohols, such as methanol, ethanol, and isopropanol work well for this method. Alternately, the water-immiscible organic solvent can be removed by pouring the particle dispersion into a water-miscible organic solvent and the particles can be retrieved by filtration or sedimentation.

The product beads, having excellent colloidal stability, can be stored as an aqueous dispersion or freeze dried to yield a solid powder which will easily redisperse in water.

The following examples are intended to further illustrate, but not to limit, the invention.

EXAMPLES

Unsaturated Polyester 1 with sulfonate content of 1411 eq/metric ton.

| Reagent # | Reagent | Amount (g) | mole | Mole % in polymer |
|---|---|---|---|---|
| 1 | 5-sulfoisophthalic acid, dimethyl ester, sodium salt. | 82.41 | 0.28 | 25.0 |
| 2 | Hydroquinone bis(2-hydroxyethyl) ether | 110.29 | 0.56 | 50.0 |
| 3 | Sodium acetate | 2.28 | 0.03 | — |
| 4 | Titanium (IV) isopropoxide | 0.18 | $6.33 \times 10^{-4}$ | — |
| 5 | Diethyl fumarate | 47.90 | 0.28 | 25.0 |

Reagents 1–4 were combined in a 500 ml 3-neck flask equipped with a stainless steel stirring rod, nitrogen inlet, and an arm leading to a dry ice/acetone condenser connected to a controlled vacuum system. The reaction was heated in a bath containing a metal heating alloy. A steady stream of nitrogen was passed over the reaction mixture for 10 minutes, and then reduced to a slightly positive flow. The temperature was held at 200° C. for 50 minutes, ramped to 260° C. over 25 minutes, then held at 260° C. for 25 additional minutes at which point to a clear, slightly orange prepolymer resulted and the calculated amount of methanol distillate had been collected in a graduated cylinder. The reaction was removed from the bath, allowed to cool, and Reagent 5 was added. The reaction was restarted at 220° C. and within 15 minutes ethanol condensate began to collect. The reaction was held at 220° C. for 250 minutes at which point the polymer melt had become notably viscous and any observable boiling had ceased. A vacuum was initiated at 200 torr and ramped to 0.5 torr over 20 minutes. After 10 minutes at 0.5 torr, the viscosity had increased to the point where the polyester could no longer be effectively stirred and the reaction was terminated. The polymer was determined by size exclusion chromatography (SEC) (20% dichloroacetic acid/$CH_2Cl_2$) to have $Mn=6790$ and $Mw=10,400$.

Unsaturated Polyester 2 with sulfonate content of 487 eq/metric ton.

| Reagent # | Reagent | Amount (g) | mole | Mole % in polymer |
|---|---|---|---|---|
| 1 | 5-sulfoisophthalic acid, dimethyl ester, sodium salt. | 14.35 | 0.05 | 6.6 |
| 2 | 1,4-Cyclohexanedimethanol, mixture of cis/trans. | 53.76 | 0.37 | 48.7 |
| 3 | Sodium acetate | 0.20 | $2.43 \times 10^{-3}$ | — |
| 4 | Zinc acetate dihydrate | 0.022 | $1.00 \times 10^{-4}$ | — |
| 5 | Antimony III oxide | 0.018 | $6.18 \times 10^{-5}$ | — |
| 6 | Isophthalic acid | 24.14 | 0.15 | 19.7 |
| 7 | Fumaric acid | 22.49 | 0.19 | 25.0 |

This polyester was prepared in a two stage polycondensation reaction similar to that of Preparative Example 1 using the same apparatus except performed entirely at ambient pressure. Reagents 1–5 were heated at 220° C. for 120 minutes at which point a clear prepolymer had resulted and the expected amount of methanol had been collected. The reaction was removed from the heating bath for 1 hour and Reagents 6 and 7 were added. The reaction was then continued at 220° C. and within 10–15 minutes water condensate began to collect in the trap. The reaction was continued at 220° C. for 180 additional minutes until the polyester became too viscous to stir. The polyester was found to have $Mn=3130$ and $Mw=7340$ by size exclusion chromatography in dimethylformamide eluent.

degassed with nitrogen for 10 minutes, and heated overnight (~16 hours) at 60–70° C. The toluene was then removed as a water azeotrope via rotary evaporation and the resulting dispersion of porous beads was purified by diafiltration with 3–6 volumes of water through a 100K cutoff membrane or through dialysis using dialysis tubing with a 50K cutoff.

Figure 2:
FIG. 2. Scanning electron micrograph of Bead 2 in Example 3.
Figure 3:
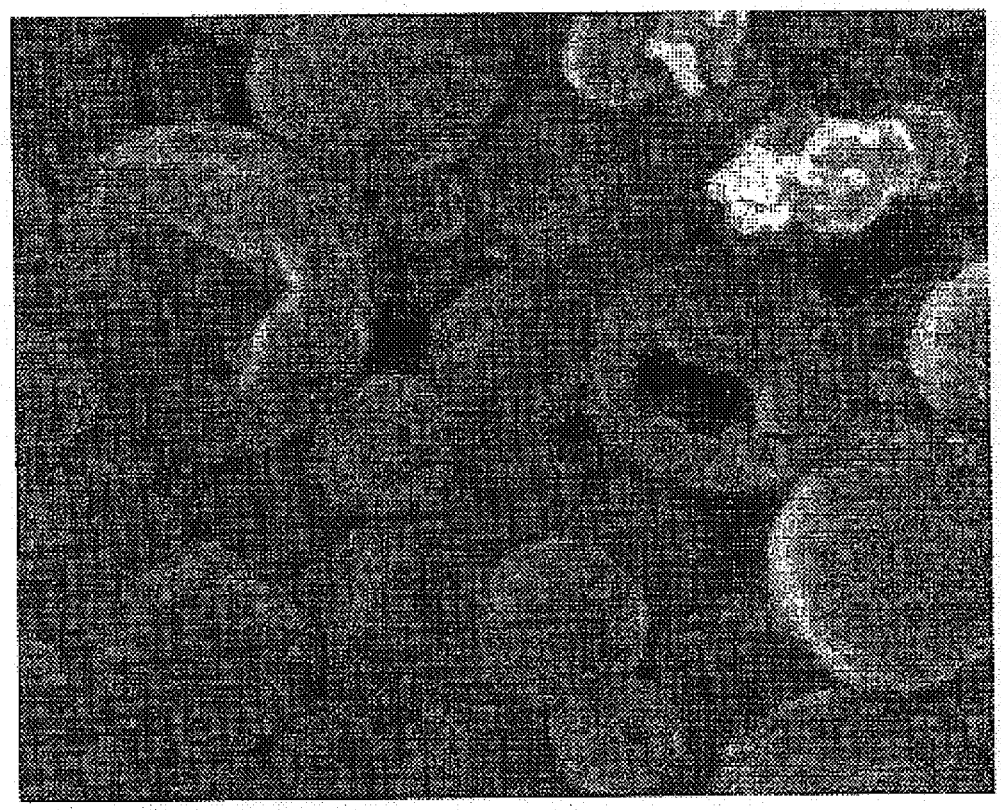
FIG. 3. Scanning electron micrograph of Bead 3 in Example 3.
Figure 4:
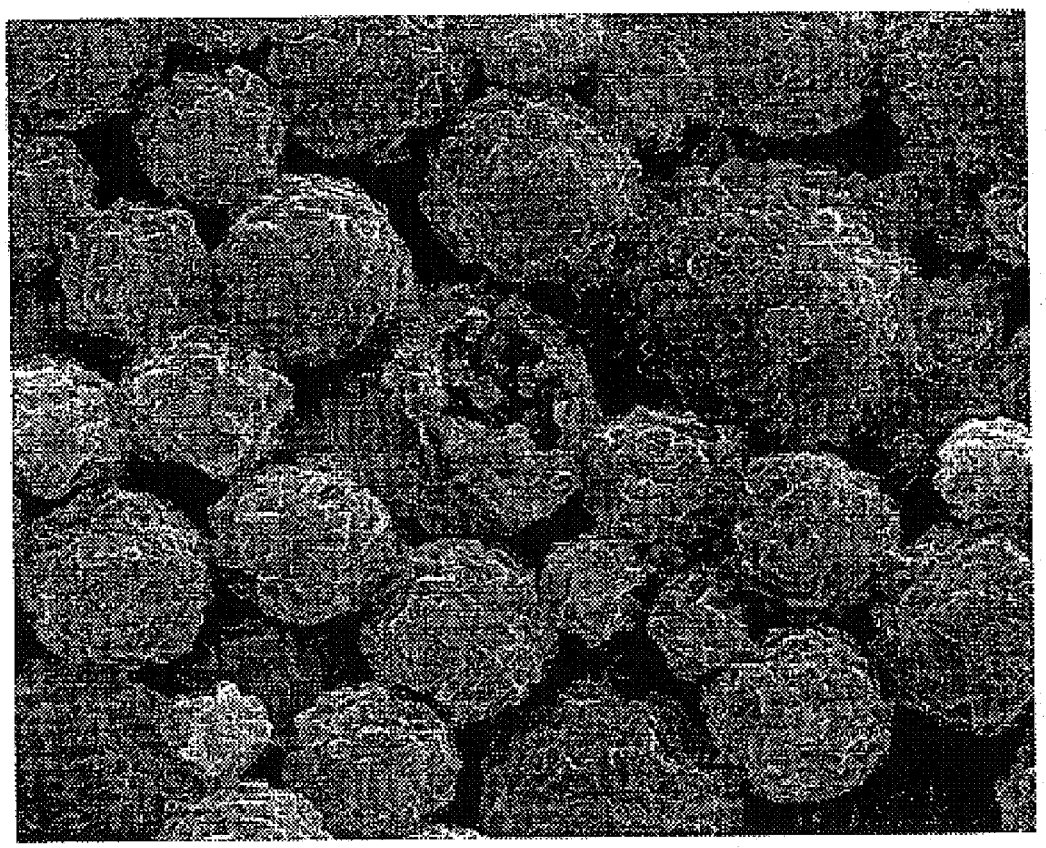
FIG. 4. Scanning electron micrograph of Bead 4 in Example 3.

The mean particle sizes were measured using a Horiba LA-920® particle size analyzer and were found to be 2.64, 0.50, 2.93, and 3.01 µm respectively for Beads 1,2,3, and 4. Scanning Electron Micrographs showing the porous morphologies of the beads are shown in FIGS. 1–4.

Example 4
Porous Beads Prepared From Unsaturated Polyester 2 and Divinylbenzene Using Microfluidization.

A similar procedure was used as that described in Example 3. 20.00 g Polyester 2 was dispersed in 240 ml deionized water by heating at 70° C. for 4 hours with vigorous stirring and then cooling to room temperature. An organic phase consisting of 20.00 g divinylbenzene, 46 ml toluene, 4.1 ml hexadecane, and 0.40 g AIBN was prepared and added to the dispersed polyester. The mixture was passed twice through a Microfluidics Model No. 110T microfluidizer, bubble degassed with nitrogen for 10 minutes, and heated for 16 hours at 70° C. The toluene was removed as a water azeotrope via rotary evaporation and the resulting particle dispersion was purified by diafiltration with 6 volumes of water through a 100K cutoff membrane. The mean particle size was measured using a Horiba LA-920® particle size analyzer and found to be 0.280 µm. A dried portion of the dispersion, analyzed by B.E.T. Multipoint using a Quantachrome Corp. NOVA 1000® analyzer had a specific surface area of 92.11 $m^2/g$ Example 5
Surfactant-Stabilized Porous Beads Prepared from an Oil-Soluble Unsaturated Polyester.

To a beaker were added the following components: 104 g divinylbenzene (DVB-HP®, Dow Chemical Corp.), 26 g of Porous beads prepared from Unsaturated Polyester 1 and divinylbenzene using various emulsification methods.

| | Polyester 1 (g) | Water (g) | Toluene (g) | AIBN (g) | Hexadecane (g) | Divinyl-benzene[1] (g) | Emulsification method |
|---|---|---|---|---|---|---|---|
| Bead 1 | 20.0 | 257.0 | 40.0 | 0.40 | 1.06 | 20.0 | h[2] |
| Bead 2 | 20.0 | 257.0 | 40.0 | 0.40 | 1.06 | 20.0 | s[3] |
| Bead 3 | 30.0 | 386.0 | 60.0 | 0.60 | 1.60 | 30.0 | m[4] |
| Bead 4 | 20.0 | 600.0 | 160.0 | 0.80 | 2.00 | 20.0 | s[3] |

[1]80% (w/w) with remainder being ethylstyrene. Mixture of 3 and 4 isomers.
[2]Reaction mixture was homogenized using a Silverson L4R mixer at the highest speed setting for 10 minutes.
[3]Reaction mixture was homogenized for 10 minutes as described above and then sonicated using a Vibra Cell ® probe sonicator (Sonics & Materials Inc.)
[4]Reaction mixture was homogenized as described above then microfluidized by passage through a M-110T Microfluidizer ® sold by Microfluidics.

A similar procedure was used for the preparation of Beads 1–4, as illustrated in FIGS. 1–4. The polyester was heated in water at ~60° C. to yield a cloudy dispersion and cooled to room temperature. An organic phase was prepared by combining the toluene, AIBN, divinylbenzene, and hexadecane. The aqueous and organic phases were combined and emulsified by either homogenization, sonication, or microfluidization to yield an opaque white reaction mixture. If sonication was chosen as the emulsification method, the reaction mixture was placed in an ice bath during sonication to avoid a rise in temperature. The reaction mixture was poured into a 1L 3 neck round bottomed flask and fitted with a mechanical stirrer, nitrogen inlet, and reflux condenser, bubble an organic-soluble fumarate-based polyester resin (Atlac 382E® obtained from Reichhold Inc.), 66 g toluene, 4 g hexadecane, and 1.9 g 2,2'-azobis(2,4-dimethylvaleronitrile) (Vazo 52®, from DuPont Corp.). The components were stirred until all the solids were dissolved.

To this solution was added a mixture of 12 g N-Alkyl (C12–C16)-N,N-dimethyl-N-benzyl ammonium chloride (Barquat MB-50®, from Lonza Inc.) in 600 g water. The mixture was then stirred with a marine prop type agitator for 5 minutes to form a crude emulsion. The crude emulsion was passed twice through a Gaulin® homogenizer at 4000 psi. The resulting monomer droplet dispersion was poured into a 1-liter three-necked round bottom flask, nitrogen inlet, and mechanical stirrer and heated at 50° in a constant temperature bath under positive pressure nitrogen for 16 hours. The product was filtered through a coarse filter to remove coagulum. Next, 0.3 g MAZU® antifoam agent (BASF Corp.) was added and the toluene was distilled off under vacuum at 50° as a water azeotrope to yield a white dispersion of 21.0% solids. The median particle diameter was measured by a particle size analyzer, Horiba LA-920®, and found to be 0.15 μm. A dried portion of the dispersion, analyzed by B.E.T. Multipoint using a Quantachrome Corp. NOVA 1000® analyzer had a specific surface area of 125 $m^2/g$.

Example 6

Silica-Stabilized Porous Beads Prepared from an Oil-Soluble Unsaturated Polyester.

To a beaker were added the following components: 45.5 g divinylbenzene (DVB-HP®, Dow Chemical Corp.), 26 g of an organic-soluble fumarate-based polyester resin (Atlac 382E® obtained from Reichhold Inc.), 151.5 g toluene, and 1.0 g 2,2'-azobis(2,4-dimethylvaleronitrile) (Vazo 52®, from DuPont Corp.). The ingredients were stirred until all the solids were dissolved.

To this solution was added a mixture of 2.5 g sodium acetate trihydrate, 5.0 g acetic acid, 1.8 g of a low molecular weight copolymer of methylaminoethanol and adipic acid, and 21.7 g 50% silica (Ludox TM®, DuPont Corp.) in 402 g water. The mixture was then stirred with a marine prop type agitator for 5 minutes to form a crude emulsion. The crude emulsion was passed once through a Gaulin® homogenizer set at 4000 psi. The resulting monomer droplet dispersion was poured into a 1-liter three-necked round bottom flask, nitrogen inlet, and mechanical stirrer and heated at 50° in a constant temperature bath under positive pressure nitrogen for 16 hours. The product was filtered through a coarse filter to remove coagulum. Next, 0.3 g MAZU® antifoam agent (BASF Corp.) was added and the toluene was distilled off under vacuum at 50° as a water azeotrope to yield a white dispersion of 20.7% solids. The dispersion was then filtered through a coarse filter to remove coagulum. The median particle diameter was measured by a particle size analyzer, Horiba LA-920®, and found to be 2.9 μm. A dried portion of the dispersion, analyzed by B.E.T. Multipoint using a Quantachrome Corp. NOVA 1000® analyzer had a specific surface area of 309 $m^2/g$.

The invention has been described in detail with particular reference to certain preferred embodiments thereof, but it will be understood that variations and modifications can be effected within the spirit and scope of the invention.

What is claimed is:

1. A method of forming porous particles comprising preparing a mixture of an organic phase and an aqueous phase, said mixture comprising an unsaturated polyester, a water immiscible organic solvent, at least one organic-soluble ethylenically unsaturated monomer, and initiator; subjecting said mixture to high energy emulsification; initiating crosslinking of said polyester after emulsification; and removing said water immiscible organic solvent to recover porous polyester particles.

2. The method of claim 1 wherein said initiating crosslinking is initiated by heating.

3. The method of claim 1 wherein prior to preparing said mixture said polyester is in said aqueous phase.

4. The method of claim 1 wherein prior to preparing said mixture said polyester is in said organic phase.

5. The method of claim 1 wherein said mixture further comprises an emulsifier.

6. The method of claim 1 wherein said mixture further comprises an emulsifier in said aqueous phase.

7. The method of claim 1 wherein said high energy emulsification comprises high shear mixing.

8. The method of claim 1 wherein said high energy emulsification comprises sonication.

9. The method of claim 1 wherein said high energy emulsification comprises homogenization.

10. The method of claim 1 wherein said high energy emulsification comprises microfluidization.

11. The method of claim 2 wherein said heating is at a temperature of between 30 and 100 degrees C.

12. The method of claim 2 wherein said heating is for a period of between 0.5 and 16 hours.

13. The method of claim 1 wherein said removing of said organic solvent is by evaporation.

14. The method of claim 1 wherein said removing of said organic solvent is by azeotropic distillation.

15. The method of claim 1 wherein said removing of said organic solvent is by low pressure distillation.

16. The method of claim 1 wherein said removing of said organic solvent is by diafiltration or dialysis.

17. The method of claim 1 wherein said initiating of crosslinking is by redox initiation.

18. The method of claim 1 wherein said removing of said organic solvent is by pouring the mixture after crosslinking into a water miscible organic solvent and recovering said particles by filtration or sedimentation.

19. The method of claim 1 wherein said particles after removal of said water immiscible organic solvent are freeze dried.

20. The method of claim 1 wherein said mixture further comprises a cosurfactant stabilizer.

21. The method of claim 1 wherein said mixture further comprises colloidal inorganic particles.

22. The method of claim 1 wherein said polyester comprises at least one acid equivalent member selected from the group consisting of maleic, fumaric, itaconic, phenylenediacrylic acid, citraconic and mesaconic.

23. The method of claim 22 wherein said polyester further comprises a sulfonated diacid.

24. The method of claim 22 wherein said polyester has an acid number of at least 10.

25. The method of claim 22 wherein said polyester has an average (Mn) molecular weight of 1,000 to 30,000 gm/mole.

26. The method of claim 1 wherein said at least one organic soluble ethylenically unsaturated monomer comprises at least one member selected from the group consisting of styrene, alkylstyrenes, divinylbenzene, ethylene glycol dimethacrylate, ethylene glycol divinyl ether, divinyl adipate, cyclohexanedimethanol divinyl ether, and methacrylate esters.

27. The method of claim 1 wherein said at least one organic soluble ethylenically unsaturated monomer comprises at least two ethylenically unsaturated chemical functionalities.

28. The method of claim 27 wherein said chemical functionalities are selected from at least one member of the group consisting of vinyl groups, acrylates, methacrylates, vinyl ethers, and vinyl esters.

29. The method of claim 1 wherein said initiator is selected from the group consisting of azo compounds, organoperoxides, organohydroperoxides, persulfate salts, and redox initiators.

30. The method of claim 1 wherein said water immiscible organic solvent is at least one member selected from the group consisting of benzene, toluene, xylene isomers, acetate esters, isopropyl ether, butyl ether, chloroform, carbon tetrachloride, and 1,2-dichloroethane.

31. The method of claim 5 wherein said emulsifier is selected from the group consisting of sulfosuccinate esters and their salts, tetraalkylammonium salts, alkylphenol ethoxylates, PEO-PPO block copolymers, poly(vinyl alcohol), poly(vinyl pyrrolidone), salts of long chain alkylsulfonates, sulfonated alkylated diphenyl ethers, naphthalenesulfonate salts, alkylbenzenesulfonate salts, and colloidal silica.

32. The method of claim 1 wherein said unsaturated polyester and said at least one organic-soluble ethylenically unsaturated monomer are present in a weight ratio of 7:1 to 1:7.

33. The method of claim 1 wherein said unsaturated polyester comprises at least 20 mole percent unsaturated diacid units based on total diacid units.

34. The method of claim 1 wherein said unsaturated polyester has an ionic group equivalent molecular weight of between 400 and 2000 grams of polymer per mole of ionic unit.

* * * * *